United States Patent
Parriaux (10) Patent No.: US 8,238,025 B2
(45) Date of Patent: Aug. 7, 2012

(54) DIFFRACTIVE POLARIZING MIRROR DEVICE

(75) Inventor: Olivier Parriaux, Saint-Etienne (FR)

(73) Assignee: Olivier Parriaux, Saint-Etienne (FR)

( * ) Notice: Subject to any disclaimer, the term of this patent is extended or adjusted under 35 U.S.C. 154(b) by 31 days.

(21) Appl. No.: 13/002,445

(22) PCT Filed: May 20, 2009

(86) PCT No.: PCT/EP2009/056172
§ 371 (c)(1),
(2), (4) Date: Jan. 3, 2011

(87) PCT Pub. No.: WO2010/000542
PCT Pub. Date: Jan. 7, 2010

(65) Prior Publication Data
US 2011/0102877 A1    May 5, 2011

(30) Foreign Application Priority Data
Jul. 4, 2008   (EP) ..................................... 08290661

(51) Int. Cl.
G02B 5/30        (2006.01)
G02B 27/44       (2006.01)

(52) U.S. Cl. ........ 359/486; 359/245; 359/487; 359/488; 359/497; 359/498; 359/563; 359/572; 359/576; 359/584

(58) Field of Classification Search .................. 359/245, 359/486, 487, 488, 497, 498, 563, 572, 576, 359/584
See application file for complete search history.

(56) References Cited

U.S. PATENT DOCUMENTS
4,828,356 A * 5/1989 Hobrock et al. .............. 359/629
(Continued)

FOREIGN PATENT DOCUMENTS
EP          0 798 574 A2     1/1997
(Continued)

OTHER PUBLICATIONS

F. Pigeon, et al., "Polarizing Grating Mirror for CW Nd:YAG Microchip Lasers", IEEE Photonics Technology Letters, Jun. 2000, pp. 648-650, vol. 12, No. 6.
(Continued)

Primary Examiner — Evelyn A. Lester
(74) Attorney, Agent, or Firm — Sughrue Mion, PLLC (57) ABSTRACT

A polarizing mirror device including an optical substrate (1) of real refractive index $n_s$; a dielectric multilayer mirror (2), composed of dielectric layers of low and high refractive index; and a corrugated grating layer (6) of local period $\Lambda$ at the side of a cover medium of refractive index $n_c$. The local period $\Lambda$ is selected such that upon substantially normal incidence of an incident wave at wavelength $\lambda$ from the cover medium there is no diffraction order other than the $0^{th}$ reflected order in the cover medium, such that the field of the $+1^{st}$ and $-1^{st}$ orders diffracted into the layers of the multilayer and into the optical substrate have a non-evanescent propagating character, and such that the respective angles under which the $+1^{st}$ and $-1^{st}$ orders propagate in each layer of said multilayer have an absolute value larger than or equal to the angle corresponding to the angular band edge of the central TM reflection band and, if a central TE reflection band of finite angular width exits, smaller than the angle corresponding to the angular band edge of this central TE reflection band in the angular spectrum of the multilayer at the wavelength $\lambda$ with a fictive incident medium having the index of the considered layer of this multilayer.

15 Claims, 7 Drawing Sheets

U.S. PATENT DOCUMENTS 5,555,255 A * 9/1996 Kock et al. .................. 372/96
6,680,799 B1 * 1/2004 Parriaux et al. ............... 359/584

FOREIGN PATENT DOCUMENTS

WO 2007/071794 A2 6/2007

OTHER PUBLICATIONS

Marwan Abdou Ahmed, et al., "Radially polarized 3 kW beam from a $CO_2$ laser with an intracavity resonant grating mirror", Optics Letters, Jul. 1, 2007, pp. 1824-1826, vol. 32, No. 13.

Marwan Abdou Ahmed, et al., "Multilayer polarizing grating mirror used for the generation of radial polarization in Yb:YAG thin-disk lasers", Optics Letters, Nov. 15, 2007, pp. 3272-3274, vol. 32, No. 22, XP-001509376.

Federico Canova, et al., "High-efficiency, broad band, high-damage threshold high-index gratings for femtosecond pulse compression", Optics Express, Nov. 12, 2007, pp. 15324-15334, vol. 15, No. 23, XP-002503432.

A V Nesterov, et al., "Generation of high-power radially polarized beam", J. Phys. D: Appl. Phys., 1999, pp. 2871-2875, vol. 32, No. 22, XP-000947412.

* cited by examiner

DIFFRACTIVE POLARIZING MIRROR DEVICE

CROSS REFERENCE TO RELATED APPLICATIONS

This application is a National Stage of International Application No. PCT/EP2009/056172 filed May 20, 2009, claiming priority based on European Patent Application No. 08290661.1 filed Jul. 4, 2008, the contents of all of which are incorporated herein by reference in their entirety.

FIELD OF THE INVENTION

The present invention concerns light polarization by means of a diffraction grating associated with a multilayer mirror. More particularly, the invention concerns a diffractive polarizing device formed by a grating multilayer mirror having a reflection coefficient difference between the local TE and TM polarizations. The TE polarization is defined as the local polarization having the electric field parallel to the local grating lines and the TM polarization as the local polarization having the magnetic field parallel to the local grating lines. In particular, the incidence of the wave on the mirror is essentially normal to the layers of the dielectric multilayer.

BACKGROUND OF THE INVENTION

A grating polarizing mirror is known from U.S. Pat. No. 6,680,799 B1, which couples one of the local polarization components of the incident wave to a mode of the multilayer of the corresponding polarization. This mode can be a true guided mode of an all-dielectric multilayer or a true mode of the multilayer experiencing losses at a metal surface adjacent to the multilayer or a leaky mode of an all-dielectric multilayer. A first problem faced by the device disclosed by document U.S. Pat. No. 6,680,799 B1 is that the spectral position of mode excitation by the grating strongly depends on the refractive index and thickness of the layers of the multilayer as well as on the grating depth and line/space ratio. A second problem is that the filtering out of a polarization relies upon mode excitation which is inherently accompanied by a field enhancement in some layers of the multilayer, therefore to a possible degradation of the laser damage threshold in case the polarizing mirror is used in a high power laser.

Another polarizing mirror is known from EP 0798574 A2, which enhances the reflection coefficient of one of the polarization components of the incident wave by destructive interference of the corresponding polarization in the transmission medium whereas the orthogonal polarization gets partially transmitted. A first problem faced by this device is that it is difficult to fabricate the needed deep and well controlled line/space ratio binary corrugation. A second problem is that, in a laser application, the needed high index substrate is located within the laser cavity which can give rise to undesired thermal lensing if not to a degradation of the laser damage threshold if the substrate is made in a semiconductor material like GaAs. A third problem is that the high, possibly 100% reflection coefficient of the desired polarization is accompanied by a strong field enhancement in the corrugation region which may lead to a degradation of the laser damage threshold.

SUMMARY OF THE INVENTION

An object of present invention is to overcome the above mentioned problems of the prior art by proposing a diffractive polarizing device which shows a very wide bandwidth, much larger fabrication tolerances and moderate field enhancement in the corrugation region.

A particular object of the invention is to provide such a diffractive polarizing device for a laser installation, wherein the substrate of the grating multilayer mirror is placed at the outside of the laser cavity.

The present invention therefore concerns a diffractive polarizing mirror device comprising an optical substrate of refractive index real part $n_s$, a dielectric multilayer mirror composed of layers of low and high refractive index, and a grating layer arranged at the side of a cover medium of refractive index $n_c$ and defining a corrugated grating of local period $\Lambda$, this device being characterized in that the local period $\Lambda$ is selected such that upon substantially normal incidence of an incident wave at wavelength $\lambda$, from the cover medium there is no diffraction order other than the $0^{th}$ reflected order in this cover medium, such that the field of the $+1^{st}$ and $-1^{st}$ orders diffracted into the layers of said multilayer and into the optical substrate have a non-evanescent propagating character, and such that the respective absolute angle under which the $+1^{st}$ and $-1^{st}$ orders propagate in each layer of said multilayer is larger than or equal to the angle corresponding to the angular band edge of the central TM reflection band and, if a central TE reflection band of limited angular width exists, smaller than the angle corresponding to the angular band edge of this central TE reflection band in the angular spectrum of said multilayer at the wavelength $\lambda$ with a fictive incident medium having the index of the considered layer of this multilayer.

It is to be noted that the optical substrate is generally non-metallic, that the real part of its refractive index is preferably close to the refractive index of one of the materials which the multilayer is made in, and that this optical substrate is possibly absorptive. The dielectric multilayer consists preferably of only two materials of respective high and low refractive index. This multilayer exhibits a reflection coefficient between a few tens of percents and 100%, depending on the application, under normal incidence in the absence of the grating. The corrugation grating is preferably formed of a binary corrugation (preferably made of a high index material so as to have high diffraction efficiency at small corrugation depth). The optical substrate can also form a mechanical substrate, but such a mechanical substrate can also be formed by a further substrate of any material, for instance metal. The multilayer is designed so as to preferably exhibit an electric field maximum at the last layer interface (at the incidence medium side) in the absence of the grating. The grating period $\Lambda$ is such that there are no propagating diffraction order except the $0^{th}$ reflected order in the incidence medium in the wavelength range $\Delta\lambda$ centred at wavelength $\lambda_0$ in which the polarizing function is required which amounts to the condition $\Lambda < \lambda_0 - \Delta\lambda/2$, if the cover medium is air or vacuum, or $\Lambda < (\lambda_0 - \Delta\lambda/2)/n_c$ if the cover medium has the refractive index $n_c$.

The local period of the grating is such that the $+1^{st}$ and $-1^{st}$ diffraction orders transmitted into the multilayer and into the optical substrate have a non-evanescent field character; i.e. do not experience total internal reflection at the boundaries between the layers of the multilayer and between the first layer of this multilayer and this optical substrate. This condition on the grating period $\Lambda$ is $\Lambda > (\lambda_0 + \Delta\lambda/2)/\min(n_l, n_s)$ where $n_l$ is the refractive index of the low index layers of the multilayer and $n_s$ is the real part of the index of the optical substrate. Furthermore, a result of the features of the mirror device according to the invention is that the $+1^{st}$ and $-1^{st}$ transmitted TM diffraction orders experience a reflection notably smaller than 100% at the layer interfaces and leak into the optical substrate, and that the $+1^{st}$ and $-1^{st}$ transmitted TE orders experience strong and preferably close to 100% reflection. If the ratio between large and low layer index is larger that approximately 1.7, the Brewster angle is contained in the angle interval between the TE and TM band edges. If the index ratio is smaller than approximately 1.7, the Brewster angle is outside this angle interval; it is advantageous in this last case, but not necessary, to expand the angular width of the central TE reflection band by increasing the low and high index layer thickness beyond the quarter wave thickness, e.g. by setting the layer thicknesses to a quarter wave thickness under off-normal incidence. This generates a shift of both TE and TM band edges to larger angles, but the Brewster angle does not change and thus becomes contained in the TE-TM band edge interval whereas the TE reflection under normal incidence remains for instance larger than 99%. In so doing, the incident TM polarization diffracted by the grating propagates down the multilayer substantially without reflection, inducing therefore an efficient, non-resonant or weakly resonant leakage of the incident TM polarization into the optical substrate.

The multilayer is also preferably designed (number of layers, layer thicknesses, layer refractive index) so as to exhibit essentially 100% reflection for the $+1^{st}$ and $-1^{st}$ TE-polarized orders diffracted by the grating into the multilayer. Under such condition, the corrugation has close to zero $+1^{st}$ and $-1^{st}$ orders TE diffraction efficiency. The diffraction of the TE $+1^{st}$ and $-1^{st}$ orders in the multilayer is highly reflected (close to 100%); consequently, the normally incident TE polarization is only reflected or transmitted according to the $0^{th}$ grating order whereas the TM polarization leaks efficiently into the optical substrate in the form of the transmitted $-1^{st}$ and $-1^{st}$ orders through the multilayer. This leak takes place without or with moderate modal resonance. Therefore the polarization filtering is very wide band and there is no or small energy accumulation in the multilayer. Thus the laser damage threshold in a laser application is not degraded.

In addition to providing a polarization selective decrease of the reflection for the TM polarization, the device of the invention can provide a given phase difference between the TE and TM field reflection coefficients.

We can summarize the characteristics of main elements of the polarizing mirror device as follows:

a) Grating

The period is smaller than the smaller wavelength of the desired reflection spectrum in the cover material (i.e. there is no propagating diffraction order in the incidence medium except the incident and reflected $0^{th}$ orders). The period is larger than the larger wavelength of the desired reflection spectrum in the low index layers of the multilayer and in the optical substrate (i.e. the TE and TM $+1^{st}$ and $-1^{st}$ order fields in the multilayer and in the substrate are non evanescent). Furthermore, the period is such that the angular direction of the $+1^{st}$ and $-1^{st}$ TE and TM orders in each layer of the multilayer is located in the angle interval between the angles in each layer corresponding to the TE and TM angular band edges.

b) Multilayer (in the Absence of Grating)

The multilayer provides a prescribed reflection coefficient for normal incidence. In a laser mirror application the reflection coefficient is approximately 100% for an implementation in the back mirror, and is less than 100%, for instance 80%, if implemented in the laser coupler.

The multilayer provides close to 100% reflection for the $+1^{st}$ and $-1^{st}$ TE diffraction orders of the grating. The multilayer is preferably, but not necessarily, made of alternate layers of low and high index materials of quarter wave thickness under a condition of normal incidence.

The multilayer provides field maximum at the last interface at the incidence medium side where the corrugation is located.

c) Substrate(s)

The optical substrate permits the leakage of the TM $+1^{st}$ and $-1^{st}$ orders. This implies that the real part $n_s$ of the optical substrate refractive index is larger than $(\lambda+\Delta\lambda/2)/\Lambda$. $n_s$ is preferably larger or equal to the low refractive index of the layers composing the multilayer mirror. An additional mechanical substrate can be made of a dielectric or metallic or semiconductor material.

BRIEF DESCRIPTION OF THE DRAWINGS

The present invention will be further described in more details in conjunction with the annexed drawings, given by way of illustrative and non-limiting examples, in which.

DETAILED DESCRIPTION OF THE ILLUSTRATIVE EMBODIMENTS

Figure 1:
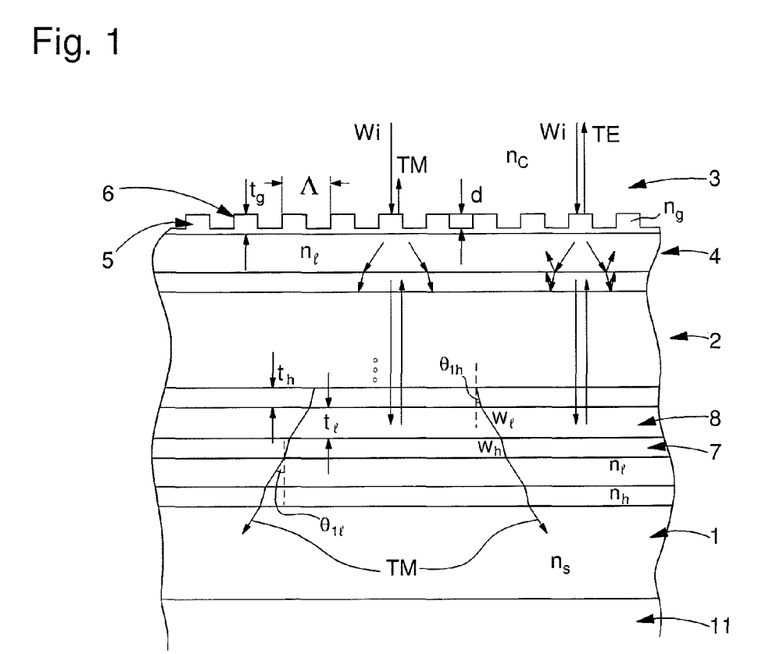
FIG. 1 is a transverse view of a preferred embodiment of a diffractive polarizing mirror device according to the invention.

FIG. 1 is the transverse view of the polarizing device of the invention comprising an optical substrate 1 composed of any dielectric or semiconductor material of real part of refractive index $n_s$, a mechanical substrate 11 composed of any material, for instance a metal, a multilayer 2 preferably composed of alternate layers 7 and 8 of high refractive index $n_h$ and low refractive index $n_l$ of thicknesses $t_h$ and $t_l$ respectively, both $t_h$ and $t_l$ being for instance, but not necessarily, quarter wave thicknesses for a wave $W_i$ of vacuum wavelength $\lambda$ incident essentially normally from the cover medium 3 of refractive index $n_c$ smaller than $n_h$ and $n_l$, $t_h=\lambda/(4n_h)$, $t_l=\lambda/(4n_l)$. The stack of layers 2 finishes at the cover medium side with a last layer 4 of preferably low index $n_l$ of thickness essentially equal to $t_l$. On top of layer 4 is a thin grating layer 5 made in a material of refractive index $n_g$ and thickness $t_g$. $n_g$ is preferably larger than $n_h$ to ensure large diffraction efficiency by means of a shallow corrugation 6. The corrugation 6 has a period $\Lambda$ and a depth d. In FIG. 1 the corrugation 6 is represented as a binary corrugation with rectangular grooves; however, the groove profile can also be sinusoidal, trapezoidal, etc. The grooves may also have a duty cycle different from 0.5. The reason for having last layer 4 of low index is to give rise to a field maximum under normal incidence at the interface between the last layer and the cover medium 3 as it is known by those familiar with the art of multilayer mirrors. This condition ensures that the grating corrugation has large diffraction efficiency without being too deep, thus easier to fabricate and generating a relatively low scattering loss level. If however corrugated layer 5 has a high refractive index such as germanium and is thicker than about one half of a quarter wave layer, layer 4 can be of high index $n_h$ as well.

The period $\Lambda$ of corrugation 6 is determined on the basis of two criteria: first, the grating does not give rise to propagating diffraction orders in the cover medium 3 other than the $0^{th}$ order; this implies that $\Lambda<(\lambda-\Delta\lambda/2)/n_c$. Secondly, the directions $\theta_{1h}$ and $\theta_{1l}$ relative to the normal of the $+/-1^{st}$ diffraction orders created by the grating in the different layers of multilayer 2, these diffraction orders defining waves $W_l$ and $W_h$ respectively propagating in the high and low index layers 7 and 8, have respective angles whose absolute value is comprised within the angle interval between the TM and TE band edges (16 and 18, FIG. 2) in the angular reflection spectrum of the multilayer. If the Brewster angle $\theta_B$ between to adjacent layers is contained in this angle interval, these directions are preferably equal to the Brewster angle. The relationship between the period and the angle of propagation in layers 8 and 7 is $\Lambda=\lambda/(n_l \sin\theta_{1l})=\lambda/(n_h \sin\theta_{1h})$. The Brewster angle between adjacent layers is $\tan\theta_{1h}=n_l/n_h$ and $\tan\theta_{1l}=n_h/n_l$ in the high index and low index layers 7 and 8 respectively. This is to ensure that the diffraction orders of the TM polarization propagate with small reflection through the multilayer 2 and leak into the optical substrate 1.

The Brewster condition is very tolerant because the TM reflection coefficient remains small in a wide angular domain around the Brewster angle. The strict condition which the multilayer stack 2 must actually satisfy is a close to 100% reflection of the + and $-1^{st}$ diffraction orders of the TE polarization. This ensures that the grating can not give rise to any TE diffraction order other than the $0^{th}$ reflected and transmitted orders as shown in FIG. 1. This condition on the TE polarization diffraction can simply be expressed by stating that the angles $\theta_{1h}$ and $\theta_{1l}$ are contained within the TE central reflection band (also called the "stop band" in the photonic crystal community) in the TE angular spectrum of the multilayer. The stop band can be used in the present invention down to and inclusive of the TM band edge 16, and up to but not inclusive of the TE band edge 18 since the $+/-1^{st}$ TE diffraction orders must be highly reflected. Therefore a quantitative criterion, in a preferred variant, for how close to the TE band edge the direction of the $+/-1^{st}$ orders can be is to state that the upper useable angular limit of the TE-TM angle interval is the angle where the TE reflection falls below 98%.

The conditions which prevail in the device of the invention between the TM Brewster angle, the band edges of the TE and TM reflection angular spectra, and the refractive index and thicknesses of the materials of the device will now be described and illustrated by considering the structure consisting of the multilayer 2 without the layers 4 and 5, i.e., only composed of the alternate high and low index layers 7 and 8, the optical substrate 1 having the refractive index $n_s$ equal to the index $n_l$ of the low index layers. This model structure has no grating; it is a multilayer mirror with a fictive incidence medium of index equal to that ($n_l$) of the low index layers. This choice of the incidence medium and optical substrate of low index $n_l$ permits to vividly simulate the transmission and reflection under different probe angle $\theta$ of the waves of TE and TM polarization in the multilayer from normal to 90 degree incidence through all the reflection and transmission peaks, in particular the Brewster condition, and between the TE and TM reflection band edges where the device of the invention operates. Scanning $\theta$ from 0° to 90° in an incidence medium of index $n_l$ corresponds to scanning the angle $\theta_{1l}$ in the low index layers of the multilayer between 0° and 90° and the angle $\theta_{1h}$ in the high index layers of the multilayer between 0 and $\arcsin(n_l/n_h)$; it also amounts to a scan of the period $\Lambda$ of the grating generating the $+1^{st}$ and $-1^{st}$ orders having the directions $\theta_{1l}$ and $\theta_{1h}$ in the low and high index layers of the multilayer between infinite and $\lambda/n_l$ respectively since $\Lambda=\lambda/(n_l \sin\theta)$.

It would have been also possible to simulate the reflection and transmission features of the multilayer by making a scan of the probe incidence angle in a fictive incident medium of index $n_h$ instead of $n_l$, or any index larger than $n_l$; with $n_h$ index in the fictive incidence medium the incidence angle $\theta_{fh}$ at which some feature of the multilayer would occur is approximately $\theta_{fh}=\arcsin(n_l \sin\theta_{fl}))$ where $\theta_{fl}$ is the angle in the fictive incidence medium of the same feature of the multilayer; the period $\Lambda$ which would be needed to direct the $+1^{st}$ and $-1^{st}$ orders of the grating in the direction where a desired feature of the multilayer occurs would be $\Lambda=\lambda/(n_h \sin\theta_{fh})$; it is also given by $\Lambda=\lambda/(n_l \sin\theta_{fl})$. Thus, the period $\Lambda$ of the grating corrugation 6 is such that upon normal incidence of the incident wave $W_i$ at wavelength $\lambda$ from the cover medium there is no diffraction order other than the $0^{th}$ reflected order in the cover medium, such that the field of the $+1^{st}$ and $-1^{st}$ orders diffracted into the layers 7 and 8 of the multilayer 2 and into the optical substrate 1 have a non-evanescent propagating character, and such that the respective angles under which the $+1^{st}$ and $-1^{st}$ orders propagate in each layer of the multilayer have an absolute value larger than or equal to the angle corresponding to the angular band edge of the central TM reflection band and smaller than the angle corresponding to the angular band edge of the central TE reflection band in the angular spectrum of the multilayer at the wavelength $\lambda$ with a fictive incident medium having the index of the considered layer of this multilayer.

Figure 2:
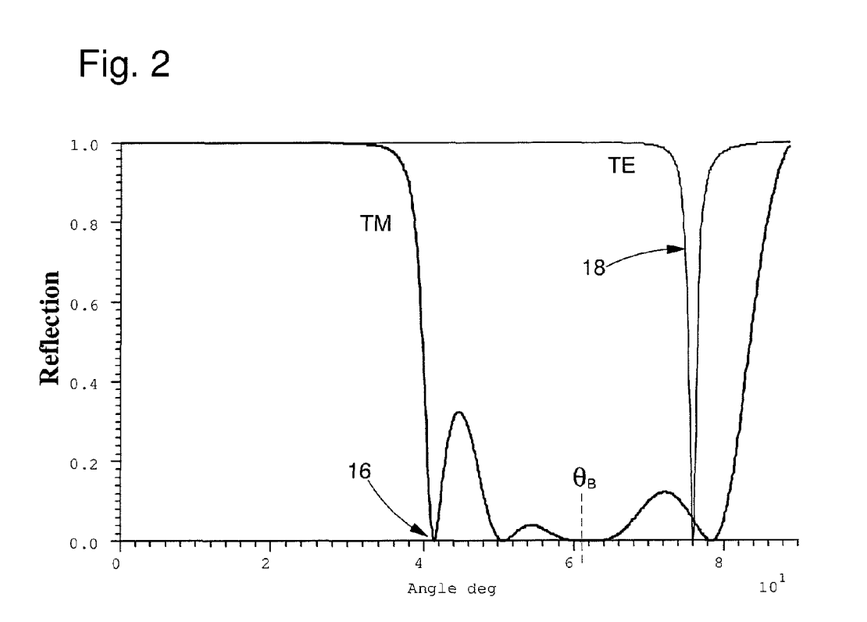
FIG. 2 is the representation of the TE and TM angular reflection spectra, versus the incidence angle of an incident wave in a given medium, of a first example of periodic multilayer mirror.

The angular reflection spectrum of the structure for the TE and TM polarizations with 17 alternate layers (9 ZnSe layers of refractive index $n_h=2.4$ and 8 ThF$_4$ layers of index $n_l=1.32$ at wavelength $\lambda=10600$ nm) is shown as an example in FIG. 2. The layer thicknesses $t_l$ and $t_h$ are such that all layers have a quarter wave optical thickness under normal incidence, $t_h=\lambda/(4n_h)=1100$ nm, $t_l=\lambda/(4n_l)=2000$ nm. The probe angle $\theta$ is the incidence angle in the fictive incidence medium of index $n_l$ of the model structure, thus it is also the angle of the wave in the low index layers. The TE stop band is very wide and just has one transmission peak at the incidence angle of 76 degrees in the 1.32 index incidence medium; it contains the TM stop band, two TM reflection dips and also a further reflexion dip corresponding to the Brewster angle located at $\theta_B=61.2$ degrees; one TM transmission peak is outside the TE reflection band. A grating of period $\Lambda=\lambda/(n_l \sin(61.2°))=9165$ nm would direct the orders in the direction of the Brewster angle in the multilayer whereas the $+/-1^{st}$ orders of the TE polarization would be reflected. Furthermore, as $n_l \sin(61.2°) >1$, there would be no $+/-1^{st}$ reflected orders in the incidence medium, here considered as air. The chosen TM leakage direction into the optical substrate 1 can be smaller than the Brewster angle and can be that corresponding to the angle of the second TM reflection dip at $\theta=50.8$ degrees since $n_l \sin(50.8°)=1.02>1$, therefore there would be no diffraction orders in an air incidence medium. Directing the leakage along the first reflection dip at 41.5 degrees by means of a grating of period 12120 nm would give rise to $+1^{st}$ and $-1^{st}$ orders in air. Would we have represented the multilayer angular spectrum of FIG. 2 with incidence in a fictive cover medium of refractive index $n_h=2.4$ instead of $n_l$, we would have found the TE band edge at about arc $\sin(1.32/(2.4 \sin 76°))=32$ degrees, the TM Brewster angle at 28.8 degrees, and the period of the grating directing the $+1^{st}$ and $-1^{st}$ orders in the direction of the Brewster angle $\Lambda=\lambda/(2.4 \sin 28.8°)=9165$ nm approximately, i.e. essentially the same as derived from the angular spectrum of FIG. 2 with incidence from a fictive cover medium of low index $n_l$.

Figure 3:
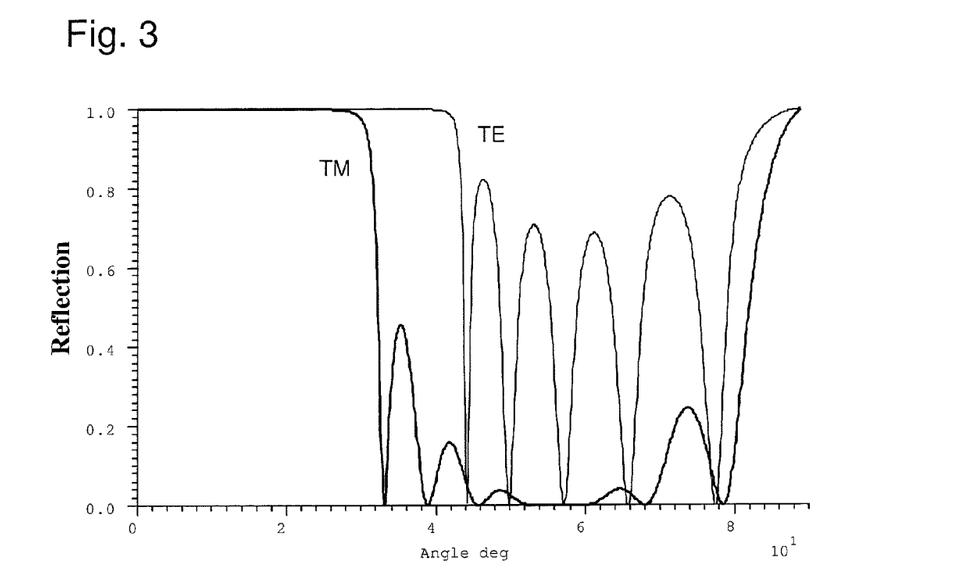
FIG. 3 is the representation of the TE and TM angular reflection spectra, versus the incidence angle of an incident wave in a given medium, of a second example of a periodic multilayer mirror.
Figure 4:
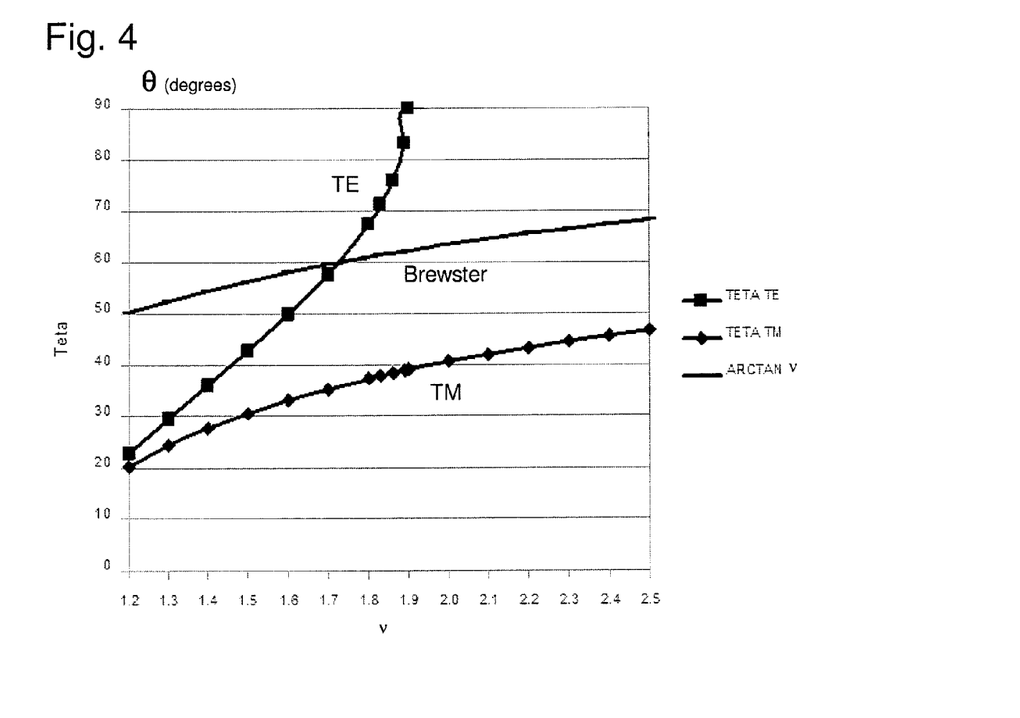
FIG. 4 is the representation of the angular position of the first TE and TM reflection band edges and of the Brewster angle versus the ratio between high and low refractive index of a periodic multilayer mirror.

FIG. 3 gives the angular reflection spectrum of another structure for the TE and TM polarizations with 29 alternate layers (15 Ta$_2$O$_5$ layers of refractive index $n_h=2.18$ and 14 SiO$_2$ layers of index $n_l=1.48$ at wavelength $\lambda=1030$ nm) with incidence from a fictive cover medium of low index 1.48. The layer thicknesses $t_l$ and $t_h$ are such that all layers have a quarter wave optical thickness under normal incidence, $t_h=\lambda/(4n_h)=118$ nm, $t_l=\lambda/(4n_l)=174$ nm. The probe angle $\theta$ is the incidence angle in the fictive incidence medium of index $n_l=1.48$. In the present example, the TE stop-band has its band edge at 43.1 degrees; it does not contain the TM Brewster angle of 56 degrees but only two TM reflection dips at 38.2 and 32.5 degrees. However, as $n_l \sin(38.2°)=0.92<1$, a grating directing the TM leakage in this direction would thus give rise to $+/-1^{st}$ orders in the air incidence medium. The spectra of FIGS. 2 and 3 have been obtained by using a standard multilayer code. The domain of operation of the device of the invention when the multilayer consists of quarter wave layers under normal incidence is represented in FIG. 4. However, a more meaningful result is that given by an analytical expression giving the band edges as well as the reflection dips of order m of the TE and TM polarizations in a periodic multilayer comprising N pairs of high and low index layers embedded in a medium of low index $n_l$.

$$\cos(k_l t_l)\cos(k_h t_h) - c \sin(k_l t_l)\sin(k_h t_h) = -\cos(m\pi/N) \quad (1)$$

where $c=(k_h/k_l+k_l/k_h)/2$ for the TE polarization, and $c=((n_l^2 k_h)/(n_h^2 k_l)+(n_h^2 k_l)/(n_l^2 k_h))/2$ for the TM polarization, $k_l=k_0 n_l \cos\theta$, and $k_h=k_0(n_h^2-n_l^2 \sin\theta)^{1/2}$ The argument $\theta$ of the sine and cosine functions is the incidence angle in the fictive low index incidence medium. The values $\theta_s$ of $\theta$ which satisfy equation (1) with m=1 are the reflection band edges in the angular spectrum of each polarization. The corresponding angles in the layers of the multilayer are $\theta_s$ in the low index layers and $\sin^{-1}(n_l/n_h \sin\theta_s)$ in the high index layers.

The transcendental expression (1) reveals that the reflection dip angular positions only depend on the ratio $v=n_h/n_l$ between the high and low index. It is therefore used in FIG. 4 to represent the reflection band edges (m=1) versus the index contrast $v$ with a number N of layer pairs such that the reflection at normal incidence is above 99%. FIG. 4 also represents the Brewster angle versus $v$. The angle represented on the vertical coordinate is the angle of incidence $\theta$ in the fictive incidence medium of index $n_l$ at which the first minimum of reflection takes place. FIG. 4 shows that the reflection band width of the TM polarization is always smaller than that of the TE polarization; it also shows that the TM Brewster angle is always larger than the TM band edge angle, and that it crosses the TE band edge curve at a value of the high to low index ratio of about $v=1.7$. Above 1.7 on the abscissa, the TM Brewster angle is within the reflection band of the TE polarization whereas below 1.7, the TM Brewster angle is outside the TE reflection band. The number 1.7 is the frontier between two types of material structures. If the $n_h/n_l$ index ratio is larger than about 1.7, the leakage of the TM polarization through the multilayer is preferably made in the direction of the Brewster angle, but it can also be made under an angle between the Brewster angle and the angle of the TM band edge provided the chosen angle $\theta_{1l}$ is such that $n_l \sin(\theta_{1l})>1$ to prevent the $+/-1^{st}$ orders from propagating in an air incidence medium. If $v$ is larger than essentially 1.9, which happens in cases where the high index material is e.g. a semiconductor, there is no TE band edge, i.e. no reflection band of finite angular width any more. Thus, the TE polarization is totally reflected whatever the incidence angle, therefore the TM Brewster angle and its neighbourhood can be freely chosen as the angle under which the TM leakage into the substrate takes place. In the photonic crystal community these multilayer structures characterized by $v>1.9$, which do not exhibit an angularly finite angular stop band, are said to be omnidirectional mirrors for the TE polarization. If the index ratio $v$ is smaller than 1.7, the leakage of the TM polarization, for an incident wave Wi under normal incidence, can only take place under an angle in the multilayer which is smaller than the Brewster angle, closer to the TM band edge provided the chosen angle $\theta_{1l}$ is such that $n_l \sin(\theta_{1l})>1$.

Figure 5:
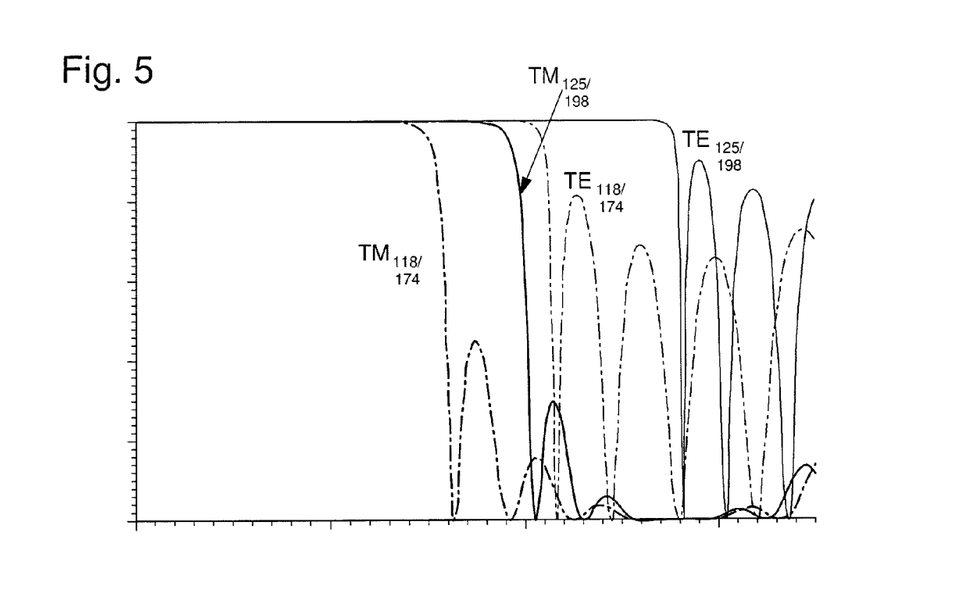
FIG. 5 shows the shift of the TE and TM angular reflection spectra of FIG. 3 with an increase of the thicknesses of the layers of the periodic multilayer mirror.

The preferred way to expand the application domain of the device of the invention to multilayers of index contrast $v$ smaller than 1.7 is to set the layer thicknesses $t_h$ and $t_l$ as quarter wave layers under an angle offset $\theta_b$ instead of under normal incidence ($\theta_b$ is defined in the fictive cover medium of low index $n_l$); this has the effect of slightly increasing the layer thicknesses from $t_h$ to $t_{ho}$ and $t_l$ to $t_{lo}$. $\theta_b$ is large enough to provoke a shift of the TE band edge to a larger angle so that the Brewster angle, which is not affected by this thickness modification, is again contained in the TE stop-band. To that end the analytical expression (1) previously mentioned can be used, but an approximate expression for the enlarged layer thicknesses due to an offset of the quarter wave thickness condition is approximately $t_{ho}=t_h(1+\theta_b^2/v^2/2)$ and $t_{lo}=t_l(1+\theta_b^2/2)$. $\theta_b$ is small enough to still permit close to 100% TE reflection under normal incidence. FIG. 5 illustrates this shift of the TE and TM reflection band edges so as to include the Brewster angle and the whole angular range between the latter and the TM band edge into the TE stop-band in the case of the index structure characterized by the reflection spectrum of FIG. 3. Instead of 174 and 118 nm the low and high index layer thicknesses are now 198 and 125 nm respectively at a quarter wave angle $\theta_b$ of 30 degrees while the TE reflection at normal incidence is kept as high as 99.85%.

There are other means for achieving close to 100% reflection of the + and $-1^{st}$ orders of TE polarization. The multilayer does not have to be composed of quarter wave layers; the layers can be composed of more than two different layer materials and the reflection band edges do not have to exhibit 100% transmission as long as there are no diffraction orders in the cover medium except the $0^{th}$ order, as the + and $-1^{st}$ order fields in all layers and in the optical substrate are non-evanescent, as the TE + and −$1^{st}$ experience essentially 100% reflection, and as the angular directions of the + and −$1^{st}$ orders in the layers is within the angle interval between the TM and TE reflection band edges. The multilayer 2 is preferably made of materials showing a large index contrast in order to reduce the number of layers needed to achieve 100% reflection for the + and −$1^{st}$ TE diffraction orders, therefore to forbid + and −$1^{st}$ order TE diffraction. The TE power reflection at an interface between layers of index $n_l$ and $n_h$ under Brewster incidence is given by $((1-(n_h/n_l)^2)/(1+(n_h/n_l)^2))^2$ which is a strongly increasing function of the index contrast $n_h/n_l$. Such materials are ThF$_4$ ($n_l$=1.32) and ZnSe ($n_h$=2.4) in the far infrared, and SiO$_2$ ($n_l$=1.46) or MgF$_2$ ($n_l$=1.38) and TiO$_2$ ($n_h$=2.4) or Ta$_2$O$_5$ ($n_h$=2.2) in the visible and near infrared domain.

Figure 6:
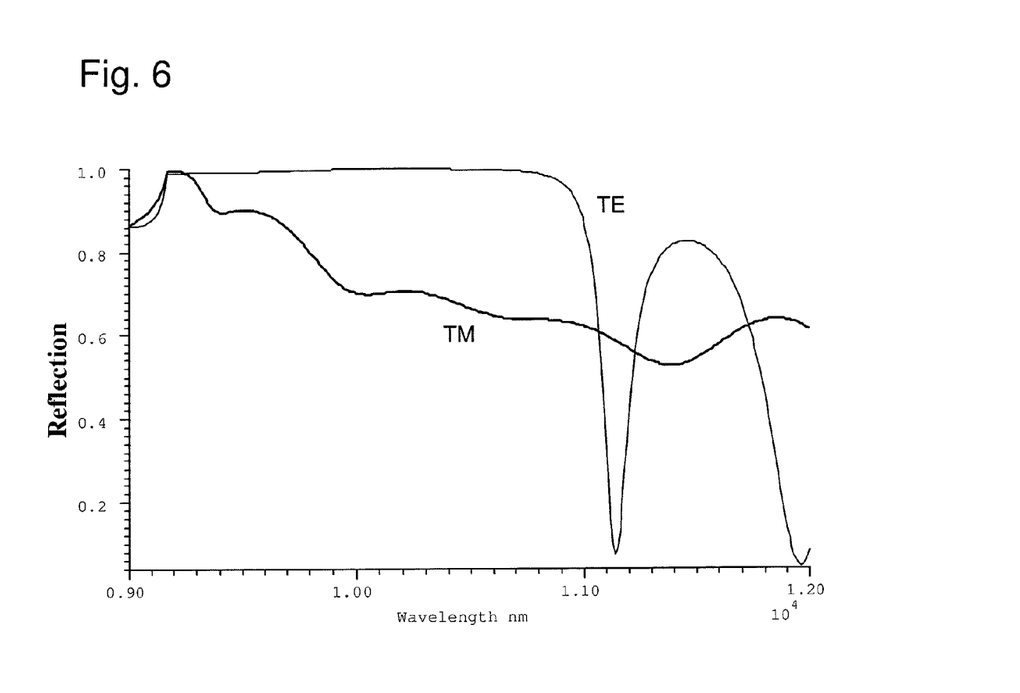
FIG. 6 represents the TE and TM reflection spectra, versus the wavelength of the incident wave, of the structure considered in FIG. 2 in the presence of a grating.

One first practical example of polarizing back mirror of a carbon dioxide laser comprises a ZnSe substrate, a set of 13 alternate layers of ThF$_4$ and ZnSe of refractive index $n_l$=1.32 and $n_h$=2.4, thus of quarter wave thicknesses under normal incidence $t_l$=2000 nm, $t_h$=1100 nm respectively, and a grating layer of $t_g$=300 nm thickness made of amorphous germanium, $n_g$=4. This example corresponds to the gratingless multilayer mirror giving the reflection spectrum of FIG. 2. The corrugation 6 is etched all through the germanium layer, thus d=$t_g$; this is not a necessary condition: there can be a non-etched residual layer of germanium to protect the underlayer of ThF$_4$ if needed; or there can be instead a very thin layer of ZnSe (50 nm for instance) under the germanium layer. The cover medium 3 is air. There is a wide tolerance on the profile of corrugation 6: it can be binary as obtained by reactive ion beam etching, the walls of the grating lines can have a rounded profile as obtained by wet etching; the line/space ratio of the corrugation is preferably 1/1. The Brewster condition for efficient TM polarization leakage is $\theta_{1l}$=61.19 degrees and $\theta_{1h}$=28.81 degrees which imposes a grating period Λ of approximately 9164 nm at the wavelength λ=10.6 μm. Although this is not the result of an optimisation, the modelling shows that more than 99.6% TE power reflection and about 62% TM power reflection can be obtained as shown in FIG. 6 sketching the TE and TM reflection spectra of the present example of polarizing mirror. The reflection spectrum is flat over more than 1 μm which gives a wide fabrication tolerance.

Those familiar in the art of multilayer systems will easily find the most adequate structure satisfying 100% reflection for the +/−$1^{st}$ TE diffraction orders and the desired reflection coefficient of the normally incident wave of TE polarization; the set of layers of multilayer 2 does not have to consist of quarter wave layers, it can be the result of an optimisation procedure adjusting the thickness of each low and high index layer so as to cancel the transmission of the +/−$1^{st}$ TE diffraction orders through multilayer 2, to provide the desired reflection coefficient for the $0^{th}$ order TE polarization, and the desired residual reflection for the $0^{th}$ order TM polarization by directing the +/−$1^{st}$ TM orders in a direction defined between the Brewster angle and the first TM band edge as long as there are no diffraction orders in the incident medium 3. For instance, it is possible to decrease the reflection of the TM polarization in the example of the above material structure down to less than 10% and even to zero power reflection while keeping the TE reflection close to 100%.

A practical example is a polarizing CO$_2$ laser coupler composed of a ZnSe substrate, a multilayer 2 formed by eight alternate layers, and a grating of the same period as in the first example directing the diffraction orders into the multilayer 2 under the Brewster angles $\theta_{1l}$ and $\theta_{1h}$, the grating being a binary corrugation made all through a ZnSe layer of thickness $t_g$=500 nm of 9164 nm period. A commercial optimisation code (MC Grating Software Development Company (www.mcgrating.com)) may be used for optimising the layer thicknesses and finds the conditions for 50% TE power reflection, 50% TE power transmission and 25% TM power reflection. The thicknesses $t_l$ and $t_h$ of the eight alternate layers are from the ZnSe grating layer 5 to the ZnSe substrate 1: $t_l$=1573 nm, $t_h$=1375 nm, $t_l$=2779 nm, $t_h$=1052 nm, $t_l$=2970 nm, $t_h$=1572 nm, $t_l$=3040 nm. The achieved TE power reflection and transmission coefficients are both larger than 49.9% at 10.6 μm wavelength with +/−$1^{st}$ order TE diffraction efficiency of less than 0.1% over 1000 nm spectral width, and the TM power reflection coefficient is 25% at 10.6 μm wavelength, and between 25% and 30% over a spectral width of 1000 nm. One checks that, after removing the grating layer, the multilayer which the optimization code finds is TE reflective at more than 99.8% and TM transmissive at more than 99.9% under Brewster incidence which proves that the conditions set by the invention for the polarizing device to operate as specified are correct. Close to the same performance can be achieved with 6 alternate layers only. It is only with four layers that the diffraction efficiency of the +/−$1^{st}$ TE orders gets slightly larger than 1% in power. When the device of the invention is used as a mirror of a laser, the reflection coefficient of the undesired polarization must be smaller than the reflection coefficient of the lasing polarization; how much smaller depends of the laser characteristics. The TM reflection coefficient can be adjusted between zero and, for instance, 98% of the TE reflection coefficient depending on the Q-factor of the laser cavity.

Figure 7:
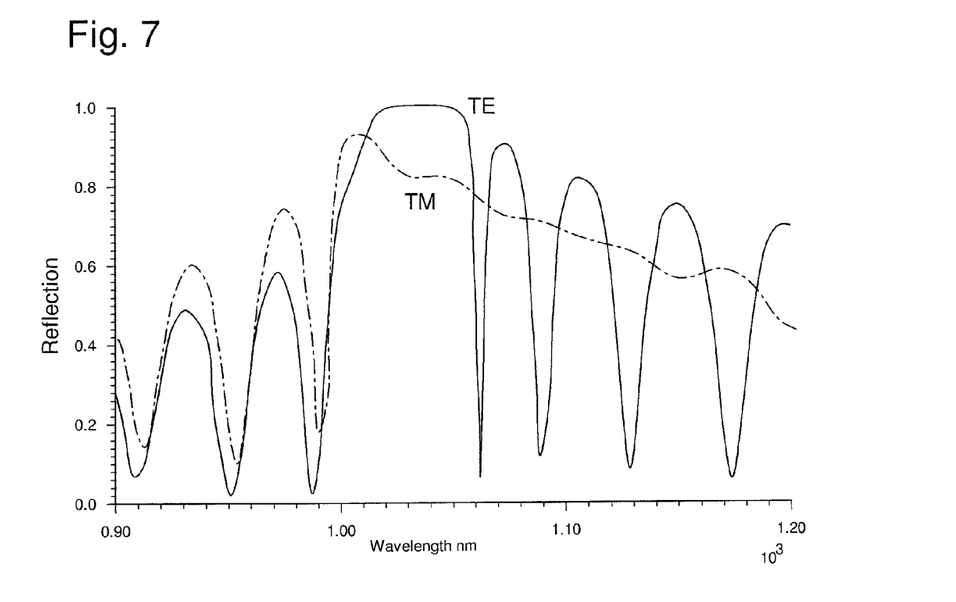
FIG. 7 represents the TE and TM reflection spectra, versus the wavelength of the incident wave, of the structure considered in FIG. 5 in the presence of a grating.
Figure 8:
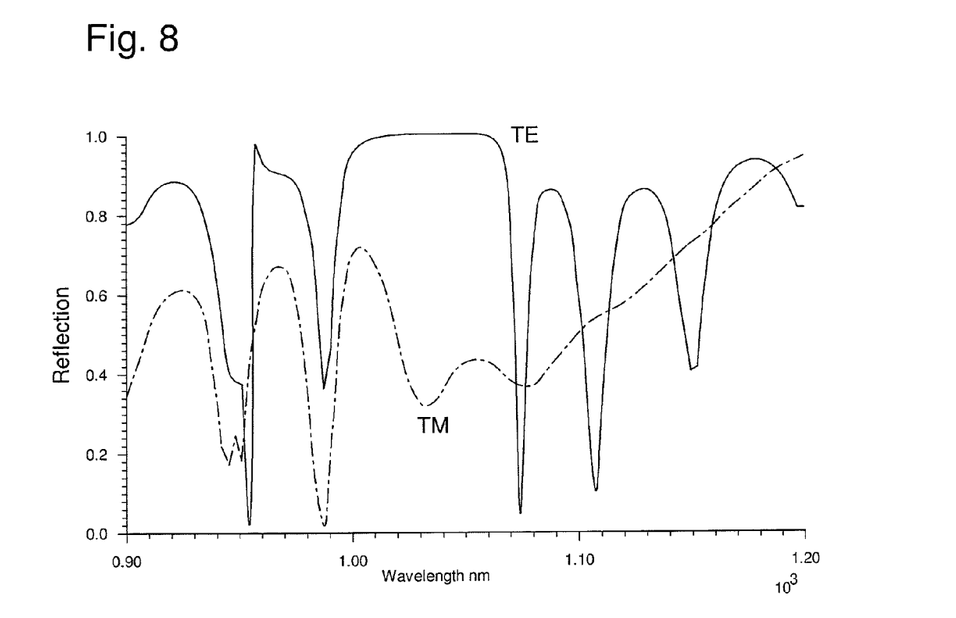
FIG. 8 represents the TE and TM reflection spectra, versus the wavelength of the incident wave, of the structure considered in FIG. 5 in the presence of a grating and improved impedence matching.

A second practical example of polarizing mirror corresponds to the gratingless multilayer mirror giving the reflection spectrum of FIG. 5. The multilayer 2 comprises layers of low and high index 1.48 and 2.18 (as in FIG. 3); the wavelength λ considered is 1030 nm corresponding to a Yb:YAG laser. After FIG. 3 has shown that the Brewster angle of this multilayer is larger than the TE reflection band edge since the index contrast ν is smaller than 1.7, FIG. 5 has shown that an angular offset of the quarter wave thickness condition widens the TE stop-band so as to contain the Brewster angle. FIG. 7 shows the TE and TM wavelength spectra of a device of the invention comprising the same multilayer as that of FIG. 5 with low and high index layer thicknesses of 198 and 125 nm where the first high index layer at the cover side is replaced by a corrugated layer 5 made of amorphous silicon of refractive index 3.5. The corrugation is of the binary type, its line/space ratio is one (or duty cycle of 0.5). The optical substrate 1 has the same index as that of the low index layers, i.e., 1.48; this is however not a necessity, the index $n_s$ can be larger since the optical substrate is just a light sink where the +/−$1^{st}$ TM orders leak. The cover medium 3 is air. As in FIG. 5 the Brewster angle is rather close to the TE band edge, it is preferable and less critical to choose a period Λ larger than 840 nm. A period Λ=900 nm was chosen. A silicon layer thickness (and groove depth) of 50 nm gives the TE and TM reflection spectra of FIG. 7 where the TE polarization has a reflection plateau of more than 99.8% around 1030 nm and the TM reflection decreases regularly and exhibits between 80 and 85% reflection in the considered wavelength range. This polarization contrast is enough to filter out the TM polarization in lasers cavities of high Q-factor. The polarization contrast can easily be increased by performing a better TM impedance match under the grating layer 5. With a 99 nm thick last SiO$_2$ layer and a 57 nm last layer of Ta$_2$O$_5$ the TM reflection experiences a strong fall as shown in FIG. 8 while the TE reflection remains larger than 99.7%. With an amorphous silicon thickness of $t_g$=70 nm, and a grating period of 935 nm, corresponding to the second TM reflection dip of the multilayer alone, a TM reflection of about 30% is obtained. A wide period range is available since the TM reflection below the Brewster angle remains very small.

Figure 9:
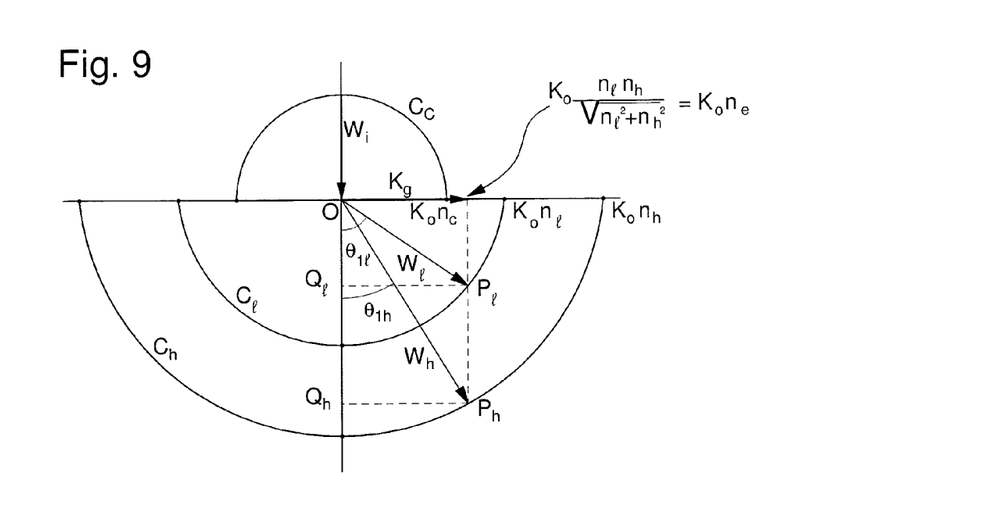
FIG. 9 is the representation of the polarizing device operation in the reciprocal space.

FIG. 9 is the k-vector diagram of the device operation in the reciprocal space of the spatial frequencies. The upper half-circle $C_c$ of radius $n_c k_0$ is the locus of the k-vectors of the plane waves propagating in the cover medium 3 where $K_0=2\pi/\lambda$. The normally incident wave, with its TE and TM polarization components, is represented by the arrow $W_i$. The half-circles $C_h$ and $C_l$ of radii $n_h k_0$ and $n_l k_0$ respectively are the locus of the plane waves propagating in semi-infinite media filled with the materials $n_h$ and $n_l$ of the high and low index layers 7 and 8 respectively. The grating k-vector $K_g$ points a spatial frequency value between $k_0 n_c$ and $k_0 n_l$ where the grating does not give rise to propagating diffraction orders other than the $0^{th}$ reflected order in the cover medium 3, and where it gives rise to propagating $+/-1^{st}$ diffraction orders in high index as well as in low index layers 7 and 8, $W_h$ and $W_l$ respectively. The spatial frequency corresponding to Brewster incidence at all interfaces of multilayer 2 is $k_0 n_e$ where one defines an "effective index" $n_e = n_l n_h/(n_l^2 n_h^2)^{1/2}$. The effective index $n_e$ is smaller than $n_l$ and $n_h$ which implies that the field in the layers of multilayer 2 always has a propagating character (as opposed to an evanescent character) in the direction normal to the plane of the device which permits an efficient leakage of the TM polarization. One can construct graphically the Brewster condition, therefore find the length of the grating k-vector $K_g$ by ensuring that the two triangles $OQ_l P_l$ and $P_h Q_h O$ are similar. The substrate index $n_s$ is preferably close or equal to $n_l$ or $n_h$. It must be strictly larger than $n_e$ so as to avoid total internal reflection for the TM + and $-1^{st}$ orders at the interface between the first layer of the multilayer 2 and the optical substrate 1.

Figure 10:
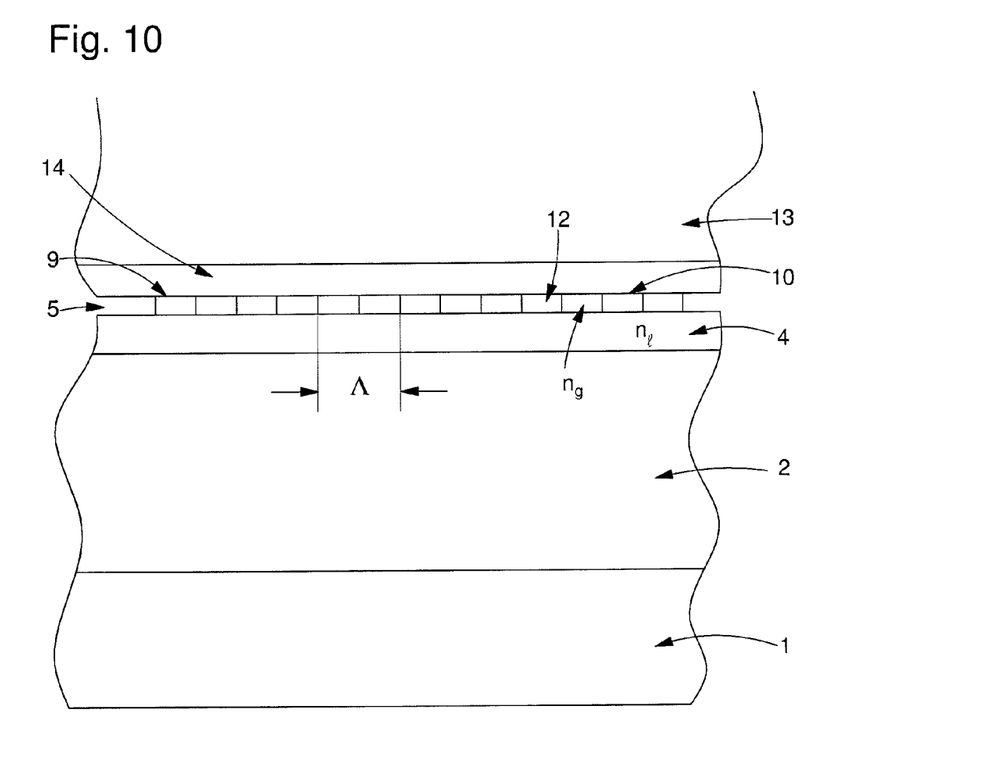
FIG. 10 is a transverse view of the polarizing mirror device with state incidence medium.

FIG. 1 illustrates a stand alone mirror which can be used as a gas laser mirror or as a mirror for solid state lasers. The device of the invention can also be used as a mirror integrated to a solid state active medium in a wafer form as for instance in surface emitting microchip lasers, disk lasers and VCSELs as illustrated in FIG. 10. The operation of the device of the invention is such that the grating layer 5 must be at the side of the laser active medium 13 which represents the structure cover 3 of FIG. 1 with refractive index $n_c$. The refractive index of active solid state materials is usually large, for instance close to 1.8 in the case of YAG. The conditions for no propagating + and $-1^{st}$ orders in the cover 13 and for propagating + and $-1^{st}$ orders in both low and high index layers of the multilayer 2 impose $n_l > n_c$ as well as $n_s > n_c$. This hard condition on the refractive index of the low index material can be soften by adding a low index layer 14 between the active cover 13 and the grating layer 5, for instance $SiO_2$ or $MgF_2$; in case of $SiO_2$ the material of the low index layers 8 can be $Al_2O_3$; in case of $MgF_2$, it can be $SiO_2$. The multilayer 2 and substrate 1 must be attached to the active cover medium 13, for instance wafer scale by Wafer Direct Bonding (G. Pandraud, C. Gui, F. Pigeon, P. Lambeck, O. Parriaux, "Bondability of processed glass wafers", Europto series, 14-18 Jun. 1999, Munich, Germany) or by means of a low index transparent binding material. The corrugated grating layer 5 can be deposited and etched at the interface 10 on the cover material 13 or on the possible low index layer 14, or it can be deposited and etched on the multilayer 2. In the example of FIG. 3 10 the grating layer is etched all through leaving lines 9 of high index $n_g$ and grooves 11 filled with air or vacuum or low index binding material.

The present polarization filtering mechanism is not limited to rectilinear gratings: the TE and TM polarization components are defined locally relatively to the local orientation of the grating lines. Any linear polarization distribution can be imposed on a wave impinging normally on the device, in particular a radial or azimuthal polarization distribution, by writing the corresponding grating line pattern by means of an electron beam or laser beam pattern generator, mask transfer and physical transfer by dry or wet etching into layer 5. Care must be taken that it is the TM polarization only which is filtered out because use is made of the Brewster condition or of the fact that the TM stop band is angularly narrower than the TE stop band. Consequently, a circular grating on a multilayer laser mirror for instance will naturally give rise to the azimuthally polarized mode of the laser. The generation of the radially polarized mode requires grating lines in the radial direction.

Figure 11:
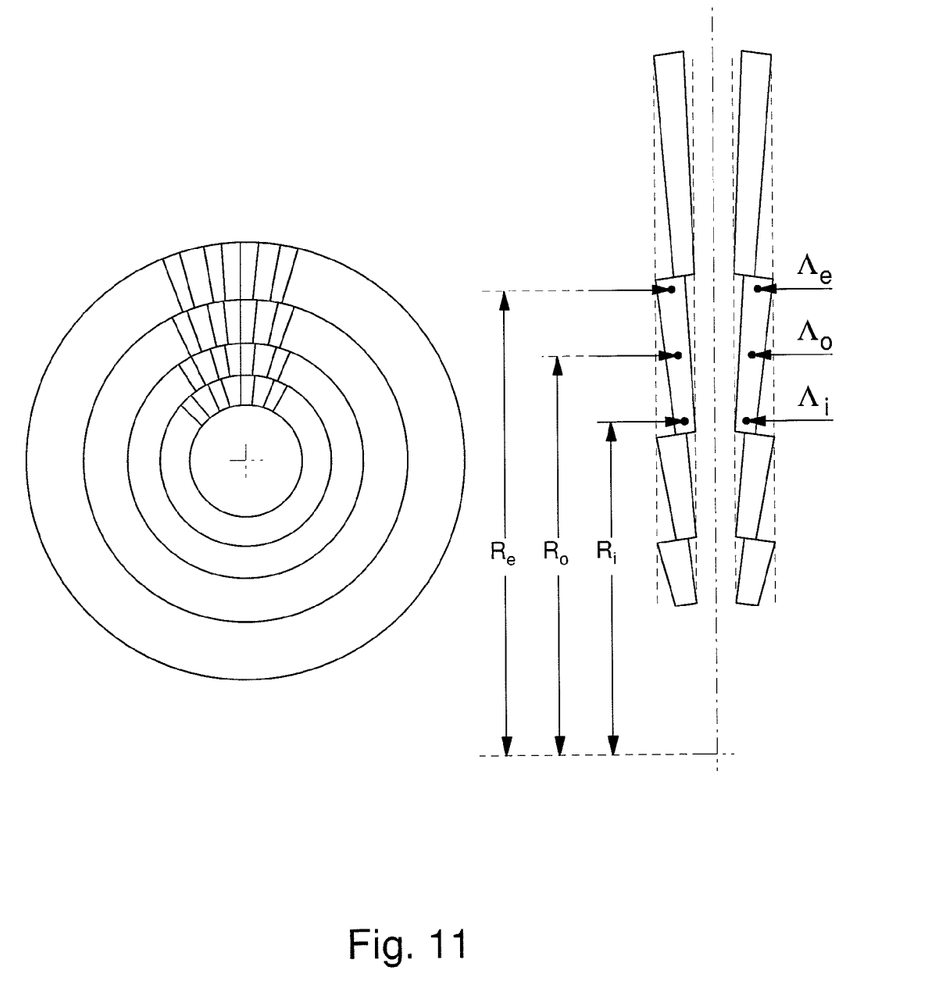
FIG. 11 is the top view of a segmented radial grating ensuring the emission of the radial polarization of a laser.

As illustrated in FIG. 11, setting an essentially constant period in a grating of radial lines requires a segmentation of the grating pattern in the form of rings, the period $\Lambda_e = \Lambda_0 + \Delta\Lambda/2$ at the outer periphery of radius $R_e$ of each ring and the period $\Lambda_i = \Lambda_0 - \Delta\Lambda/2$ at the inner periphery of radius $R_i$ of each ring being related to $R_e$ and $R_i$ and $\Delta R$ by $\Delta\Lambda/\Lambda_0 = \Delta R/R_0$ where $\Delta R = R_e - R_i$, $R_0 = (R_e + R_i)/2$, $\Lambda_0 = \lambda/(n_l \sin\theta_{1l}) = \lambda/(n_h \sin\theta_{1h})$ with $\sin\theta_{1l} = n_h/(n_l^2 + n_h^2)^{1/2}$ and $\sin\theta_{1h} = n_l/(n_l^2 + n_h^2)^{1/2}$ when $\theta_{1l}$ and $\theta_{1h}$ are preferably equal to the Brewster angles at the layer interfaces with incidence from the low and high index layers respectively in which case $\Lambda_0$ writes $\Lambda_0 = \lambda(n_l^2 + n_h^2)^{1/2}/(n_h n_l)$. The Brewster condition is the preferred operation condition in the generation of the radial polarization because it is very tolerant; when the index ration $\nu$ is smaller than 1.7, the thickness of the layers of the multilayer 2 will be enlarged as described above and illustrated in FIG. 5 to shift the TE band edge to have the Brewster condition well inside the TE stop band. The maximum acceptable value for $\Delta\Lambda/2$, consequently for the width $\Delta R$ of each ring zone having the same angular period, is determined by how far from the Brewster angle can the angles $\theta_{1l}$ and $\theta_{1h}$ be while still ensuring close to 100% reflection for the TE + and $-1^{st}$ diffraction orders in the multilayer, and still ensuring low reflection for the TM + and $-1^{st}$ diffraction orders. As none of the above two conditions result from a resonance condition, $\Delta\Lambda$ and $\Delta R$ can be relatively wide.

In designing the grating multilayer care must be taken to prevent the occurrence of spurious resonances in multilayer 2 which would create dips or peaks in the expected smooth TE and TM reflection spectra. Multilayer guided modes are not excited since the effective index $n_e$ is set to be smaller than $n_l$ and $n_h$ which implies that the grating can not excite any wave-guided mode of the multilayer. However, leaky modes of multilayer 2 can be excited. However, there are cases where the excitation of a wave-guided mode can be beneficial when not only a difference between the TE and TM modulus of the reflection coefficient is desired, but also a phase difference between them. Usually the phase difference between the electric fields of the TE and TM reflections is essentially equal to zero. In the presence of mode excitation at the operation point of the polarizing device, the phase of the reflection associated with the excitation of a waveguide mode experiences a $2\pi$ phaseshift across resonance. This means that any phase difference between reflected polarizations can be given rise to, in particular a $\pi$ phase difference, because the phase of the reflection coefficient of the non-coupled polarization remains essentially constant. There is no possibility of multilayer wave-guided mode excitation under the condition set for the grating k-vector $K_g$: $K_g = k_0 n_e$ where $n_e$ corresponds to Brewster incidence in both low and high index layers of multilayer 2. There can however be a guided mode in the grating layer 5 if its index $n_g$ and thickness $t_g$ are large enough to enable the propagation of at least the dominant mode. For instance, a thickness of the corrugated layer 5 between 150 and 450 nm is sufficient to propagate the fundamental TE mode in the above example, of a germanium layer in the wavelength domain of 10-11 µm in the presence of the grating corrugation 6 (a larger thickness would be required for the propagation of the fundamental TM mode). This is a special type of waveguide mode, originally analysed by Yariv et al. (Pochi Yeh, Amnon Yariv, and Chi-Shain Hong, "Electromagnetic propagation in periodic stratified media. I. General theory," J. Opt. Soc. Am. 67, 423-437 (1977)), whose guidance is ensured at the cover side by total internal reflection whereas the guidance at the substrate side is ensured by the multilayer reflection; although the effective index of this mode is below $n_h$, $n_l$ and $n_s$, its field remains mainly confined in layer 5. The achievement of close to 100% TE reflection and large TM leakage simultaneously with TE waveguide mode excitation at a prescribed wavelength by means of the same grating requires some adjustment.

Figure 12A:
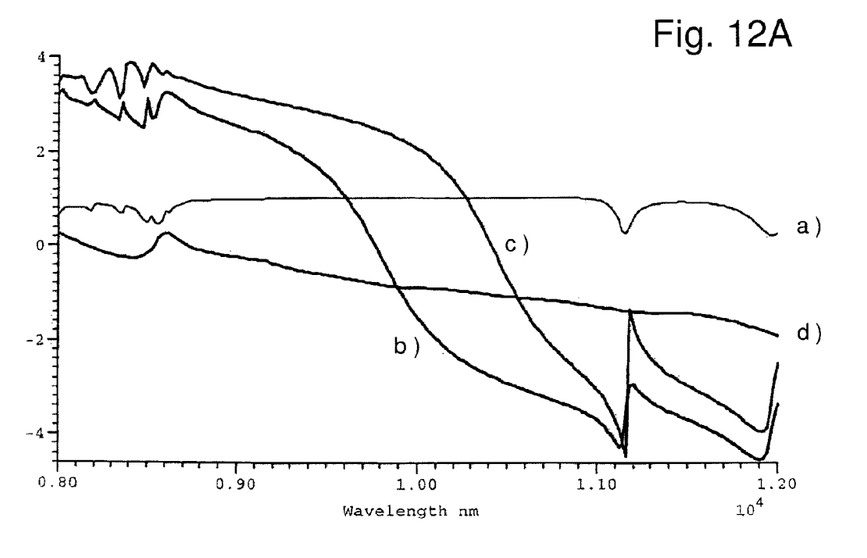
FIGS. 12A and 12B represent the wavelength dependence of the phase of the TE and TM reflection coefficients versus grating layer thickness and period.
Figure 12B:
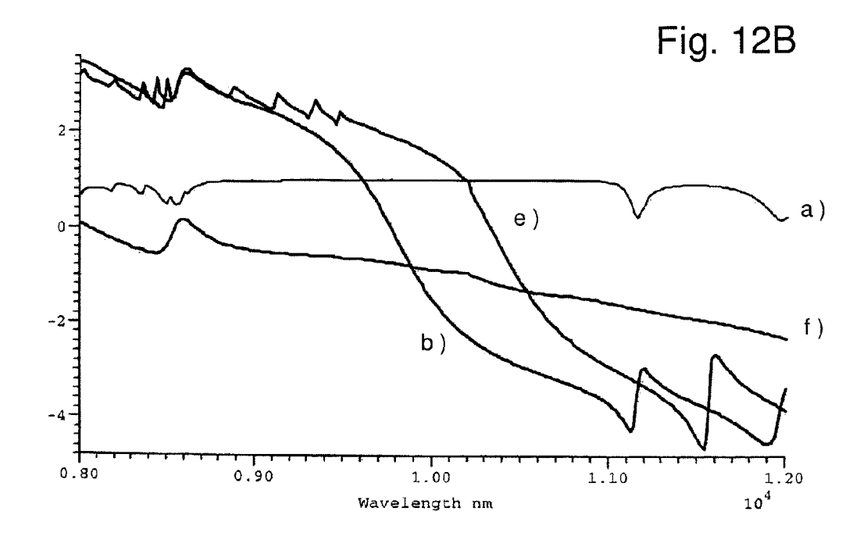

In the example of FIG. 1 applied to a $CO_2$ laser back mirror, FIGS. 12 A and B show with curves a) and b) the modulus and phase of the TE reflection versus wavelength. The modulus is close to 100% over a wide range whereas the phase exhibits the desired broad $2\pi$ change in a wavelength range below 10.6 µm. This $2\pi$ phase shift is accompanied by a field concentration and enhancement in layer 5 and its neighbourhood. There are two ways of shifting the phase change closer to the desired wavelength of 10.6 µm without affecting the condition of close to 100% TE reflection and large TM leakage. The first solution is to thicken the wave-guiding layer 5 which has the effect of increasing the effective index of the guided mode, i.e., to permit its excitation by a larger wavelength. Curves c) and d) of FIG. 12 A represent the phase of the TE and of the TM field reflection coefficients with the same period 9164 nm and a waveguide thickness $t_g=d=450$ nm instead of 300 nm. The two curves intersect close to 10.6 µm wavelength which means that the phase difference is $\pi$ since the modelling code represents the electric field reflection coefficient of a TE polarized wave and the magnetic field reflection coefficient of a TM polarized wave. The second solution is to keep the thickness of layer 5 constant (300 nm) and to shift the period to larger values. The TE reflection coefficient is close to 98.5%, the TM reflection is 55%.

Curves e) and f) of FIG. 12 B represent the phase of the TE and TM field reflection coefficients obtained with $t_g=d=300$ nm and a period $\Lambda$ shifted to 10.2 µm instead of 9164 nm. The two curves intersect close to 10.6 µm. Although the direction of the $+/-1^{st}$ diffraction orders does not exactly correspond to the Brewster condition any more, the TM (TE) reflection at layer interfaces is still small (large) enough to ensure more than 99.5% TE and less than 75% TM power reflection. The possibility of controlling the local phase of the TE reflection by means of the local period is particularly interesting in that this permits to impose a given phase distribution over the cross-section of the reflected wave. It is worth noticing that the condition of $\pi$ phase shift is not very critical since the slope of the TE phase change is small: $\pi +/-1$ radian can be obtained over a spectral width of 400 nm around 10.6 µm wavelength as can be seen in FIGS. 12 A & B. These results are not the outcome of an optimisation (in particular the TE reflection can be made closer to 100%), they simply show that a desired phase difference between the locally reflected polarizations is achievable with the device of the invention. The field enhancement in the corrugated layer 5 resulting from the excitation of a TE mode of the layer is relatively small because the effective index of this type of multilayer-guided mode can be close to the index of the cover medium (equal to 10600/10200=1.04 in the last example), therefore the field is not tightly confined in layer 5.

The examples given in the description belong to the domain of infrared applications and materials. This is not a restriction and the same conditions are satisfied in the visible and near infrared domain with low index materials like $MgF_2$, $SiO_2$, $Al_2O_3$, etc, and high index materials like $Ta_2O_5$, $Nb_2O_5$, $TiO_2$, $Si_3N_4$, $HfO_2$, $ZrO_2$, diamond, etc. The grating layer can be made of any of the above high index materials and also of amorphous silicon down to about 650 nm wavelength. In the UV domain, the low index materials are $SiO_2$, $MgF_2$, $CaF_2$, etc, and the high index materials are $Al_2O_3$, $HfO_2$, LuAG.

What is claimed is:

1. A polarizing mirror device comprising:
an optical substrate of refractive index real part $n_s$;
a dielectric multilayer mirror composed of layers of high and low refractive index $n_h$ and $n_l$; and
a grating layer arranged at the side of a cover medium and defining a corrugated grating of local period $\Lambda$,
wherein said local period $\Lambda$ is selected such that upon substantially normal incidence of an incident wave, at a wavelength $\lambda$ in the laser range, from the cover medium there is no diffraction order other than the $0^{th}$ reflected order in this cover medium, such that the field of the $+1^{st}$ and $-1^{st}$ orders diffracted into the layers of said multilayer and into the optical substrate have a non-evanescent propagating character, and such that the respective angles $\theta_{1h}$ and $\theta_{1l}$, under which the $+1^{st}$ and $-1^{st}$ orders propagate in any layer of said multilayer have an absolute value, arc $\sin(\lambda/n_l \cdot \Lambda)$ in the layers of low index and arc $\sin(\lambda/n_h \cdot \Lambda)$ in the layers of high index, which is larger than or equal to the angle corresponding to the angular band edge of the central TM reflection band and, if a central TE reflexion band of finite angular width exists, smaller than the angle corresponding to the angular band edge of this central TE reflection band in the angular reflexion spectrum of the multilayer at the wavelength $\lambda$.

2. The polarizing mirror device according to claim 1, wherein said absolute value of said respective angles in said each layer is substantially equal to an angle corresponding to a TM reflection dip in said angular reflection spectrum of the multilayer.

3. The polarizing mirror device according to claim 2, wherein said local period $\Lambda$ of the grating is arranged such that the $+1^{st}$ and $-1^{st}$ orders diffracted in said multilayer impinge at the interfaces between its layers substantially under the Brewster incidence.

4. The polarizing mirror device according to claim 3, wherein it exhibits substantially 100% TE $0^{th}$ order reflection.

5. The polarizing mirror device according to claim 2, wherein it exhibits substantially 100% TE $0^{th}$ order reflection.

6. The polarizing mirror device according to claim 1, wherein the last layer of said multilayer at the cover side is of low index.

7. The polarizing mirror device according to claim 1, wherein said multilayer is composed of a stack of quarter wave layers at the wavelength of said incident wave under normal incidence.

8. The polarizing mirror device according to claim 1, wherein said multilayer is composed of a stack of quarter wave layers at said wavelength $\Lambda$ under oblique incidence from an incidence medium of refractive index equal to the refractive index of the low index layers of this multilayer.

9. The polarizing mirror device according to claim 8, wherein said oblique incidence is smaller than or equal to 30 degrees.

10. The polarizing mirror device according to claim 1, wherein said substrate has a refractive index substantially equal to one of said low and high refractive index.

11. The polarizing mirror device according to claim 1, wherein it exhibits substantially 100% TE $0^{th}$ order reflection.

12. The polarizing mirror device according to claim 1, wherein said grating has radially periodic circular lines for azimuthal polarization generation.

13. The polarizing mirror device according to claim 1, wherein said grating is segmented in concentric rings, each ring containing radial lines of essentially identical period, for radial polarization generation.

14. The polarizing mirror device according to claim 1, wherein the grating layer propagates a guided mode excited by the corrugation.

15. The polarizing mirror device according to claim 14, wherein the phase difference between the TE and TM field reflection coefficients is approximately equal to $\pi$.

* * * * *